April 17, 1945. C. G. KIRKBRIDE 2,374,104
RECOVERY OF LIQUID HYDROCARBONS FROM HIGH PRESSURE WELLS
Filed July 5, 1940
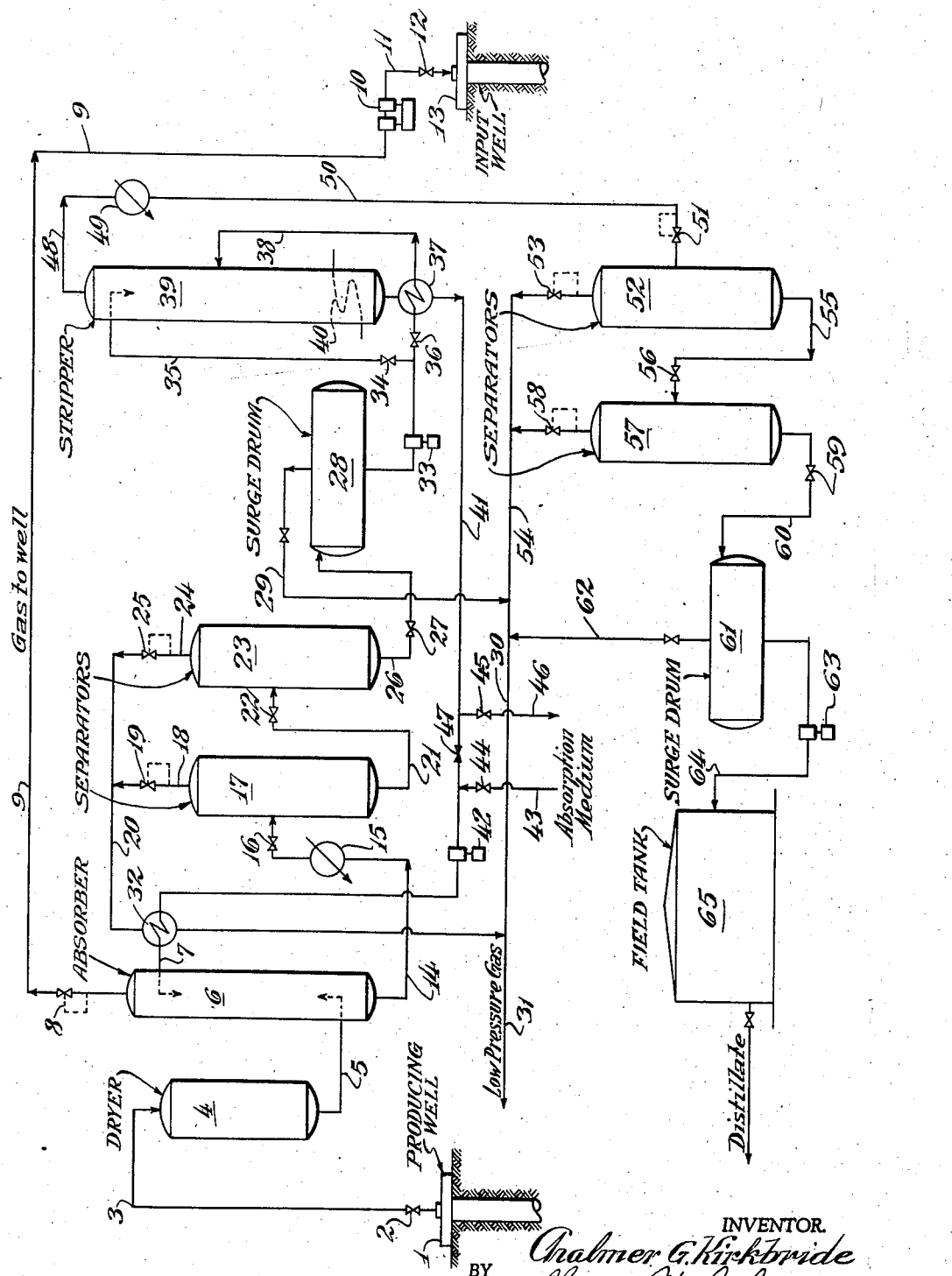
INVENTOR.
Chalmer G. Kirkbride
Clarence H. Seeley
BY
Attorney.

Patented Apr. 17, 1945

2,374,104

UNITED STATES PATENT OFFICE 2,374,104

RECOVERY OF LIQUID HYDROCARBONS FROM HIGH PRESSURE WELLS

Chalmer G. Kirkbride, Galveston, Tex., assignor to Pan American Refining Corporation, New York, N. Y., a corporation of Delaware Application July 5, 1940, Serial No. 343,918

3 Claims. (Cl. 62—175.5)

This invention relates to the recovery of liquid hydrocarbons from high pressure wells and more particularly to improved methods for economically recovering light liquid hydrocarbons from well fluids produced at high pressures and having gas-oil ratios.

In recent years advances in the art of oil-well drilling have made possible the discovery of productive formations at increasing depths and as a result certain fields have been found in which the well fluids produced are characterized by high pressure, high gas-oil ratios and the presence of little if any heavy hydrocarbons such as those usually associated with the term "crude oil." The wells producing such fluids are ordinarily called distillate wells and the light liquid hydrocarbon constituents recovered therefrom are known as distillates.

The reservoirs from which distillates are produced are invariably at pressures in excess of 1500 pounds per square inch and are usually at pressures ranging from 3000 pounds per square inch to 5000 pounds per square inch or more, and it is believed that in most cases the hydrocarbons therein exist in a single phase. Whether or not this is true, a relatively small amount of liquid is generally present in the well fluid at the well head, probably due to pressure and temperature drop through the tubing, and can be separated at that point. It is customary, however, to reduce the pressure of the well fluid with or without cooling to a relatively low value, e. g. 500 to 800 pounds per square inch, and separate the liquid distillate from the residual gas. This procedure does not give the maximum yield of distillate which is obtainable from the well fluid and, unless the residual gas is returned to the reservoir, gradually lowers the reservoir pressure, so that more and more of the valuable heavier hydrocarbons are precipitated in the formation and consequently are lost. Needless to say the compression of the enormous quantities of residual gas involved from separator pressure, e. g. 500 pounds per square inch, to a pressure sufficient to cause it to re-enter a reservoir at 2000 pounds per square inch or more is extremely expensive. It has been proposed to overcome this obstacle by carrying out the distillate separation at pressures in the neighborhood of well head pressure in the presence of additional quantities of liquid hydrocarbons similar to distillate, but this necessarily gives a low yield of distillate since at high pressures much of the added hydrocarbon mixture is vaporized due to the phenomenon known as retrograde vaporization.

I have found that maximum recovery of distillate can be obtained by contacting the well fluid at a pressure of at least 1500 pounds per square inch and preferably at a pressure approaching well head pressure with a relatively heavy absorption medium and then removing the recovered distillate from the rich absorption medium. In this way increased yields of distillate are obtained and the residual gas is available for recycling to the reservoir at a very high pressure and can be compressed for that purpose at a relatively low cost.

The method of recovering distillate by high pressure absorption is described and claimed in my co-pending application S. N. 243,947, filed December 5, 1938, of which the present application is a continuation-in-part.

Particularly suitable absorption media are those which are miscible with hydrocarbons and have critical temperatures about 700° F. and preferably above 800° F. Media having high critical temperatures are most desirable for the reason that the ability of such media to absorb relatively heavy hydrocarbons and reject methane increases with increasing critical temperature. In other words, methane has a higher equilibrium constant and the desirable liquid hydrocarbons have lower equilibrium constants in the presence of absorption media having high critical temperatures as compared with the equilibrium constants of these materials in the presence of ordinary absorption oils. This fact makes it possible to obtain exceptionally good yields of distillate and also to operate at very high pressures.

Another factor in favor of absorption media having high critical temperatures is that they also have high boiling points and are thus more easily separated from the desired distillate by distillation, particularly when the media used have narrow boiling ranges.

One other important point in connection with high pressure absorption operation is that the absorption medium should have as low a molecular weight as possible consistent with high critical temperatures and boiling points as described above, because absorption operates on a molecular basis and the same degree of absorption can be obtained with less absorption medium when it has a lower molecular weight.

I have found that the absorption media best suited to a distillate recovery operation by absorption under pressures of at least 1500 pounds per square inch and having the optimum properties are those consisting wholly or predominately of cyclic organic compounds miscible with the liquid hydrocarbons of which distillate is composed. Preferably the cyclic absorption media employed according to my invention contain large proportions of compounds of the aromatic type, although certain compounds having naphthenic and heterocyclic ring structures can be used advantageously.

It is an object of my invention to provide a more economical method of recovering valuable liquid hydrocarbons from high pressure well fluids. Another object is to provide a process for recovering light liquid hydrocarbons from high pressure wells whereby the residual gas is available for reinjection into the producing formation without excessive compression costs. Still another object is to provide a high pressure absorption method for the recovery of distillate utilizing a relatively heavy absorption medium having a high critical temperature. A further object is to provide a process of distillate recovery whereby the valuable heavier hydrocarbons are absorbed at pressures in the neighborhood of well head pressures in an absorption medium comprising predominantly cyclic compounds having the property of preferentially absorbing such hydrocarbons from a well fluid. Further objects and advantages of my invention will be apparent from the following detailed description read in conjunction with the drawing which represents schematically a suitable apparatus for practicing my invention.

My invention briefly stated comprises the absorption of the heavier constituents of a high pressure well fluid in a relatively non-volatile absorption medium such as a cyclic compound or a mixture rich in cyclic compounds, which is miscible with the distillate, has a high critical temperature and is capable of preferentially absorbing liquid hydrocarbons, at a pressure of at least 1500 pounds per square inch, for instance from 1500 to about 5000 pounds per square inch, and subsequently removing the absorbed hydrocarbons therefrom. In most cases I prefer to carry out the absorption at a pressure from about 2000 to about 4000 pounds per square inch. The temperature at which the absorption is carried out can be for example from 0° F. or lower to about 150° F., but temperatures not materially greater than 100° F. are preferred. It is desirable in most cases to carry out the absorption at a pressure as close as possible to the well head pressure of the fluid produced although this may not always be possible, for example when the fluid being processed is obtained from several wells at different pressures. If the well head pressure is excessively high, for instance more than about 5000 pounds per square inch, it may be advantageous to reduce the pressure somewhat before contacting with absorption medium according to my invention. It is preferred to utilize at least a portion of the high pressure residual gas from the absorption step by introducing it into the same or another producing formation, but this is not an essential part of my invention in its broad aspects and the gas may be otherwise disposed of if desired.

As an absorption medium I may use any suitable material which is a liquid under the absorption conditions, composed predominantly of cyclic compounds and considerably less volatile than the distillate to be recovered. The absorption medium used can be for example a petroleum fraction rich in cyclic hydrocarbons and having a critical temperature above about 700° F., but those having critical temperatures above about 800° F. are even more desirable for the reason that the ability of such media to absorb relatively heavy hydrocarbons and reject methane increases with increasing critical temperature. Oils containing relatively large proportions of aromatic hydrocarbons are therefore much preferred to other types of oils. In general, aromatic compounds having critical temperatures and other properties as above described are suitable absorption media. Examples are the cresols, triethylbenzene, diphenyl methane, liquid chloronaphthalenes, diphenyl, diphenyl ether, and mixtures of diphenyl and diphenyl ether. Other types of compounds having the properties specified above, for instance, quinoline, hexahydronaphthalene and decahydronaphthalene can also be used. Since it is preferred to use an absorption medium having a relatively low average molecular weight, for example 140 to 200, the eutectic mixture containing 75% diphenyl ether and 25% diphenyl is particularly good because it has an average molecular weight slightly above 150 and a critical temperature in the neighborhood of 1000° F.

It is most advantageous to use as absorption media materials derived from petroleum which are rich in aromatic hydrocarbons, have high critical temperatures and boiling points for a given average molecular weight, and at the same time are inexpensive. Some of these are by-products of refinery operations having little value at present except as fuel. An outstanding absorption medium in this category is a relatively heavy cut produced in the catalytic reforming of naphthas, particularly when this operation is conducted in the presence of hydrogen and an aromatization catalyst such as chromium oxide or molybdenum oxide on alumina. Such a cut having an initial boiling point in the range from about 500° F. to about 600° F. and a boiling range not exceeding 100° F. to 200° F. is very rich in alkylated polycyclic aromatic hydrocarbons and is therefore an excellent absorption medium for use in practicing my invention. In addition its high initial boiling point makes it possible to separate substantially all of the high boiling ends of the distillate by distillation, thus keeping its absorption efficiency at a maximum.

Many other refinery fractions rich in aromatic hydrocarbons can also be used. For example a fraction from a catalytic cracking process, operating either with or without the presence of hydrogen, which distills above the boiling range of distillate to be recovered, for instance in the gas oil boiling range, and, even better, a solvent extract of such a fraction, is a good absorption medium according to my invention. Another suitable material is a residual fraction produced by the vapor phase cracking of gas oil and the like, which fraction is preferably acid treated. These fractions also preferably have a high initial boiling point and a narrow distillation range.

Any suitable method of removing the absorbed distillate from the absorption medium can be employed, but I prefer to reduce the pressure of the rich absorption medium to approximately atmospheric pressure in a plurality of stages to remove most of the methane and ethane therefrom, strip the distillate from the absorption medium under a relatively low pressure, and condense and flash the distillate to atmospheric pressure in several stages. By this means the wild light ends are eliminated with minimum loss of butane and heavier hydrocarbons and a marketable distillate is obtained as a final product. If desired a stabilizing tower can be utilized in the system either before or after stripping.

My invention will now be described in connection with the drawing which shows producing well 1 from which fluid containing distillate is withdrawn at a pressure, for example, of 2000 to 4000 pounds per square inch through valve 2 and line 3, and passed through drying tower 4 which contains alumina or other material capable of absorbing the small amount of moisture present. The purpose of tower 4 is to eliminate the possibility of the formation of natural gas hydrates in the system. However, if the temperature of absorption is high enough a dryer may not be required. The dried fluid is then introduced by means of line 5 into absorber 6, in which it is intimately contacted with a relatively non-volatile absorption medium according to my invention supplied to the upper portion thereof through line 7. Absorber 6 is maintained at a pressure in excess of 1500 pounds per square inch and preferably is maintained at a pressure in the neighborhood of the well head pressure. The quantity of absorption medium supplied may, of course, vary widely depending upon the absorption efficiency, temperature, degree of absorption desired, etc.

The residual gas is withdrawn from the top of absorber 6 through back-pressure regulator 8 and line 9 and is preferably compressed to a suitable pressure, generally about 300–500 pounds per square inch above the well head pressure by compressor 10 and returned to the producing formation through line 11, valve 12 and input well 13.

The rich absorption medium withdrawn from the bottom of absorber 6 contains the hydrocarbons absorbed from the well fluid and is passed by means of line 14 through cooler 15 in which the heat of absorption is removed and valve 16 into separator 17 which is maintained at an intermediate pressure below about 1000 pounds per square inch, for example 400 pounds per square inch gauge. Here much of the propane and lighter hydrocarbons are vaporized and removed through line 18 and back pressure regulator 19 to line 20. The remaining liquid phase is then passed through line 21 and valve 22 to a second separator 23 which is maintained at a still lower pressure, for example 50 pounds per square inch gauge. The gases flashed off in separator 23 are also sent to line 20 through line 24 and back pressure regulator 25, and the distillate is passed through line 26 and valve 27 to surge drum 28 at atmospheric pressure. Obviously separation in more than two stages can be employed if desired. Some additional light hydrocarbons are vaporized in surge drum 28 and these are withdrawn through lines 29, 30 and 31 for any desired use, for instance as fuel to supply heat to the stripper which will be described later. The gases in line 20 are also passed to line 31 but their low temperature is first utilized in a heat exchanger 32 to cool the lean absorption medium flowing to absorber 6 through line 7.

The rich absorption medium is withdrawn from surge drum 28 by means of pump 33. A portion of it is sent through valve 34 and line 35 and the remainder through valve 36, heat exchanger 37 and line 38 to stripper 39 which is maintained at a suitable pressure, for example 150 pounds per square inch gauge. The portion of the rich absorption medium sent through valve 34 and line 35 acts as a reflux in the stripper 39 to prevent loss of lean oil in the overhead product. Heat is supplied to the lower portion of stripper 39 by suitable means such as steam coil 40 and the hot stripped absorption medium is withdrawn therefrom, partially cooled in heat exchanger 37 and recycled to absorber 6 by means of line 41, pump 42, heat exchanger 32 and line 7. In certain instances a cooler between heat exchangers 37 and 32 might be used to advantage.

Fresh absorption medium to fill the system is introduced through line 43 and valve 44. After a period of operation it may be desirable to recondition the absorption medium and this can be done by withdrawing all or a portion of it through valve 45 and line 46 while adding fresh or reclaimed absorption medium through line 43. During this operation valve 47 in line 41 would be partly or completely closed. The reconditioning operation can also be continuous, a small proportion of the circulating stream in line 41 being withdrawn through line 46, distilled, acid treated or otherwise purified, and reintroduced through line 43.

The light hydrocarbons removed from the absorption medium in stripper 39 are removed overhead through line 48, condensed in condenser 49 and passed through line 50 and back pressure regulator 51 to a separator 52 maintained at a lower pressure, for example 50 pounds per square inch gauge. The gases released in separator 52 pass through back pressure regulator 53 and line 54 into line 30 while the liquid therein is transferred by means of line 55 through valve 56 to a separator 57 maintained at a still lower pressure such as 25 pounds per square inch gauge. Vapors from separator 57 are released to line 54 through back pressure regulator 58 and the liquid is expanded through valve 59 and line 60 to approximately atmospheric pressure in surge drum 61, any further vapors which may be evolved being sent to line 30 through line 62. The liquid in surge drum 61 is the recovered distillate product which can be sent to storage by means of pump 63 and line 64, the storage vessel shown being a field tank 65.

It will be readily seen from the above that I have provided an extremely efficient method for recovering distillate from high pressure well fluids and that by the use of absorption media having the properties described I am enabled to obtain unusually large yields of distillate, particularly of the valuable butane and pentane constituents, without reducing the pressure of the residual gas more than a relatively small amount so that this gas is available for reinjection into the same or other producing formations without excessive compression costs. The necessary compression for recycling the gas to the formation is preferably carried out after the absorption step but all or part of it can be accomplished between the producing well and the absorber.

It is obvious that those skilled in the art will be able to supply without difficulty those details which have been omitted for purposes of simplicity, and to make certain modifications without departing from the spirit of my invention.

While I have described my invention in connection with certain specific embodiments thereof, I do not desire to be limited thereto but only by the scope of the following claims.

I claim:

1. The method of recovering desirable liquefiable constituents from distillate well gas initially at a pressure at least as high as the retrograde condensation range of said constituents which comprises, expanding the gas to a pressure within the retrograde condensation range of said constituents, countercurrently contacting the expanding gas with a relatively heavy liquid fraction containing a substantial portion of cyclic type hydrocarbon compounds, separating the resulting condensed constituents from the uncondensed gas, fractionating said condensed constituents in a relatively low boiling gasoline fraction and a relatively heavy liquid fraction containing a substantial portion of cyclic type hydrocarbon compounds, and returning at least a portion of said heavy liquid fraction to countercurrently contact the expanding gas as aforesaid, thereby raising the normal condensation pressure of the aforesaid desirable constituents.

2. The method of recovering desirable liquefiable constituents from distillate well gas initially at a pressure at least as high as the retrograde condensation range of said constituents which comprises expanding the gas to a pressure of at least about 1500 pounds per square inch and within the retrograde condensation range of said constituents, countercurrently contacting the expanding gas with a liquid hydrocarbon absorption medium containing a substantial portion of aromatic type hydrocarbon compounds, separating the resulting total liquid hydrocarbons from the uncondensed gas, fractionating said total liquid hydrocarbons into a relatively low boiling gasoline and a relatively heavy liquid fraction containing said aromatic type hydrocarbon compounds, and returning at least a portion of said relatively heavy liquid fraction containing said aromatic type hydrocarbons to said countercurrent contacting step.

3. The method of recovering desirable liquefiable constituents from distillate well gas initially at a pressure at least as high as the retrograde condensation range of said constituents which comprises expanding the gas to a pressure of at least about 1500 pounds per square inch and within the retrograde condensation range of said constituents, countercurrently contacting the expanding gas with a liquid hydrocarbon absorption medium containing a substantial portion of cyclic type hydrocarbon compounds having an average molecular weight within the range between about 140 and about 200, separating the resulting total liquid hydrocarbons from the uncondensed gas, fractionating said total liquid hydrocarbons into a relatively low boiling gasoline and a relatively heavy liquid fraction containing said cyclic type hydrocarbon compounds, and returning at least a portion of said relatively heavy liquid fraction containing said cyclic type hydrocarbon compounds to said countercurrent contacting step as said liquid absorption medium.

CHALMER G. KIRKBRIDE.